United States Patent Office.

N. B. HADLEY AND R. J. COSTAIN, OF NORTHAMPTON, MASSACHUSETTS.

Letters Patent No. 94,955, dated September 21, 1869.

IMPROVED COMPOUND FOR EMERY-WHEELS AND OIL-STONES.

The Schedule referred to in these Letters Patent and making part of the same.

*To all whom it may concern:*

Be it known that we, N. B. HADLEY and R. J. COSTAIN, both of Northampton, in the county of Hampshire, and State of Massachusetts, have invented a new and useful Compound for Emery-Wheels, Oil-Stones, &c.; and we do hereby declare the following to be a full, clear, and exact description of the said invention.

Our invention relates to the production of emery-wheels and oil-stones, some of the former being designed to take the place of grindstones, being used in the same way, while others, composed of finer emery, are designed to be used in the place of polishing-wheels, or emery-wheels, now used; and It consists of the admixture of glue, water, or alcohol, or all, and either white or red lead, or both, these ingredients forming a flux of very great hardness and tenacity, for the purpose of securing the emery.

That others skilled in the art may be able to make and use our invention, we will proceed to describe its construction, or the ingredients and their proportions.

We use—

White glue, or its equivalent, one pound.

Water, one quart.

White lead, two ounces.

Red lead, two ounces, or four ounces of either white or red lead.

Alcohol, one-half pint.

Emery, nineteen and one-half pounds.

We add the water to the glue and melt the glue; then stir in the white and red-leads; then add the alcohol, and let the whole boil fifteen minutes, or about that time. We then add the emery, and stir it in well.

The compound is then ready to be put into a mould of the desired form, and pressed into the shape desired for either emery-wheels or oil-stones.

If there is no immediate haste required in the manufacture of the stones or wheels, the alcohol may be omitted, and an equal quantity of water used instead, as the only object of using the alcohol is to more quickly dissolve the glue and lead, so that if it should be desired to fill an order for wheels or stones without any delay, we might omit the water entirely, substituting an equal amount of alcohol instead.

It is believed that the use of both white and red lead combined forms a flux which is somewhat harder and firmer than that formed by the use of either white or red lead alone; and it is also desirable sometimes to make a flux, in which either the white or red color shall predominate, to suit the fancy of customers, or to correspond with the predominating color of the emery, yet a flux of sufficient firmness and tenacity may be made by the use of either white or red lead alone; and we therefore do not limit ourselves to both combined, but may use either one or both, according to the circumstances of the case.

Some variation may be made in the quantities of the ingredients, and yet form a flux, substantially the same and equivalent to that described; but we prefer the quantities as above given as forming the firmest and most tenacious flux for the purposes of holding emery in a fixed state for grinding or polishing.

Having thus described our invention,

What we claim as new, and desire to secure by Letters Patent, is—

The compound for emery-wheels and oil-stones, substantially as herein set forth and described.

N. B. HADLEY.
R. J. COSTAIN.

Witnesses:
   JAMES R. HADLEY,
   BEN. J. WARD.